June 28, 1960  M. A. MÜLLER  2,942,872
SPRING FOR CUSHIONING PURPOSES IN VEHICLES
Filed Feb. 1, 1957
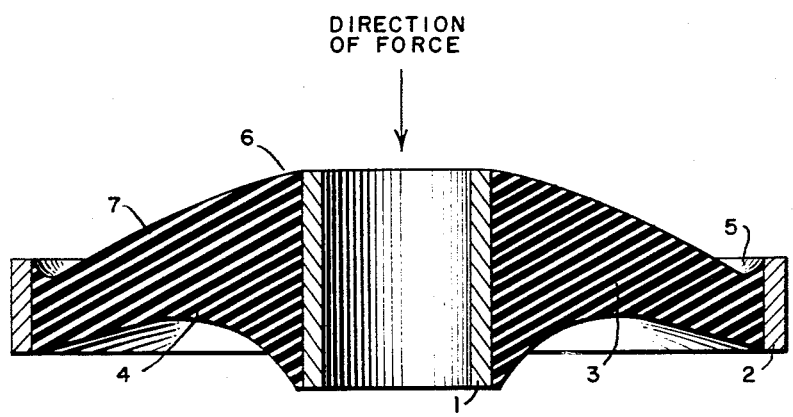
INVENTOR
MAX ADOLF MÜLLER
BY
ATTORNEY

United States Patent Office 2,942,872
Patented June 28, 1960

2,942,872

SPRING FOR CUSHIONING PURPOSES IN VEHICLES

Max Adolf Müller, Koln, Germany, assignor to Goetzewerke Friedrich Goetze Aktiengesellschaft, Koln, Germany, a corporation of Germany Filed Feb. 1, 1957, Ser. No. 637,751

Claims priority, application Germany Feb. 29, 1956

1 Claim. (Cl. 267—63)

This invention is concerned with a shock-absorbing spring for cushioning purposes in connection with vehicles and particularly motor vehicles.

Shock-absorbing springs with non-linear characteristic are known. The thought behind these springs was, in the case of tension springs extending oblique to the load to be handled, that the restoring power in the direction of the load does not correspond to the displacement ratio, but that it is related to the magnitude of the displacement motion by an angular function, even if the elongation of the spring element as such should be directly proportional to the load. Accordingly, if the angle between the axis of the spring and the direction of loading is great, relatively small forces will be sufficient to cause a strongly increasing spring displacement.

The recognition of this condition resulted in the provision of a single rubber spring, for example, a double cone spring as disclosed in United States Patent No. 2,765,163, dated October 2, 1956, functioning as a tension spring and as a compression spring in parts thereof extending oblique to the direction of the loads to be handled. The portion of the double-cone spring which faces the load applied thereto is first compressed, causing the entire spring body to be displaced in the direction in which the load is applied, such compression and displacement continuing up to a point when the spring is in a position that may be termed "dead center" after which both portions, namely, the one facing the load as well as the opposite portion facing away from the load will be placed under tension. The restoring power of the spring in a direction opposite to the direction in which the load is applied thereto is a function of the displacement of the spring which is determined by the angles at which the conical spring surfaces extend. The operating characteristic of the rubber spring may accordingly be determined by the angular configuration of the double-cone body thereof.

It is further known to make a rubber-metal spring exclusively combined of compression springs. Such a spring comprises an annular rubber body which is disposed between a relatively long inner metallic sleeve and a shorter outer metallic sleeve and vulcanized to such sleeves. The compression spring portions or elements thereby appear merely as zones in the structure which are arranged at different angles relative to the direction of the load. These zones, acting as compression spring portions accordingly are adapted to change from compression to tension after the dead center points are passed. The angles amounted in unloaded condition to less than 90°. By the differently inclined compression elements or portions contained in a single rubber body with correspondingly differently inclined outer surfaces, there may be obtained a desired characteristic with a course which is initially steep, thereupon flat and then again extending steep. It has, however, been found that aging cracks appeared within the zones facing away from the direction of the load, particularly in the presence of tensile stresses produced by static preloading of such structures.

The invention proceeds from the recognition of the fact that the disadvantages of known metal sleeve-rubber springs may be avoided if there is at static preloading practically no tensile stress in the rubber.

The invention proposes to provide a structure in which the side of the spring facing away from the load direction reverts to a zone subject to tensile stress only after the static preloading is exceeded. The expression "static preloading" is intended to mean, for example, the axle pressure of an unloaded standing motor vehicle.

In accordance with the invention, the surface of the side of the spring which faces away from the pressure to be applied, is formed concave throughout, the corresponding curvature extending radially between two metal sleeves and terminating at the respective ends of such sleeves, the zenith of such concave curvature lying at a point intermediate the metal sleeves and nearer to the edge of the inner metal sleeve. This configuration avoids overstressing of the rubber spring in the neighborhood of the inner metallic sleeve.

In order to avoid detrimental formation of folds in the rubber, the surface of the spring portion facing in the direction of the load is of convex configuration, sloping from the corresponding end of the inner sleeve radially outwardly in the direction of the outer sleeve and changing to concavity again near the corresponding end of the outer sleeve, with the zenith of said concavity radially inwardly spaced from such end of the outer sleeve, thus forming near such end of the outer sleeve a peripheral annular groove with the zenith or deepest point thereof axially and radially spaced from the corresponding end of the outer sleeve.

Extensive experiments have proved that springs made according to the invention successfully endured the action of great loads applied thereto for prolonged periods without forming folds or suffering damage by cracking.

An example of a spring according to the invention is shown in the accompanying drawing.

Numerals 1 and 2 respectively indicate the inner and outer metal sleeves between which is disposed the rubber spring 3, the sleeves being vulcanized to the spring. The side 4 of the spring 3, facing away from the side 6 at which the load is applied is of concave configuration throughout. The concave portion or groove 5 merging with the convex surface 6 of the side 7 of the spring, which faces in the direction in which the load is applied to the spring prevents formation of folds in the surface of the rubber Changes may be made within the scope and spirit of the appended claims.

I claim:

A shock-absorbing spring comprising an outer axially relatively short cylindrical metallic sleeve, an inner axially relatively long cylindrical metallic sleeve disposed concentric to said outer sleeve in radialy spaced relation thereto, said outer sleeve embracing said inner sleeve throughout an axially extending central portion thereof with the opposite ends of said inner sleeve extending axially beyond levels coinciding with the corresponding opposite ends of said outer sleeve, an annular rubber body extending radially between said sleeves and being vulcanized thereto, the load being applied to said rubber body axially of said inner sleeve at one side of said rubber body which faces the direction in which the load is applied, the surface of such side of said rubber body sloping from the corresponding end of said inner sleeve radially outwardly in convex configuration in the direction of the corresponding end of said outer sleeve and changing to concavity near said outer sleeve, the deepest point of said concavity lying at a level axially inwardly spaced from the level of said end of said outer sleeve, the curvature of said concavity continuing with a peripheral portion of said rubber body which extends to the level of the end of said outer sleeve and flush with such end, said concavity thus forming peripherally of said rubber body adjacent said outer sleeve an annular groove the deepest point of which is axially and radially inwardly spaced from the corresponding end of said outer sleeve, the surface of the opposite side of said rubber body, which faces away from the first named side at which the load is applied, being of concave configuration throughout its entire radial extent between the respective ends of said sleeves, with the zenith of the corresponding curvature disposed radially intermediate said sleeves relatively nearer to said inner sleeve.

References Cited in the file of this patent
UNITED STATES PATENTS

| | | |
|---|---|---|
| 2,719,017 | Mordarski et al. | Sept. 27, 1955 |
| 2,765,163 | Muller | Oct. 2, 1956 |
| 2,783,959 | Boschi et al. | Mar. 5, 1957 |

FOREIGN PATENTS

| | | |
|---|---|---|
| 1,089,663 | France | Oct. 24, 1953 |